US009053474B2

(12) United States Patent
White

(10) Patent No.: US 9,053,474 B2
(45) Date of Patent: Jun. 9, 2015

(54) SYSTEMS AND METHODS FOR HANDLING POINT-OF-SALE TRANSACTIONS USING A MOBILE DEVICE

(75) Inventor: Spencer White, Norcross, GA (US)

(73) Assignee: AT&T Mobility II LLC, Atlanta, GA (US)

(*) Notice: Subject to any disclaimer, the term of this patent is extended or adjusted under 35 U.S.C. 154(b) by 830 days.

(21) Appl. No.: 12/340,135

(22) Filed: Dec. 19, 2008

(65) Prior Publication Data

US 2010/0161433 A1 Jun. 24, 2010

Related U.S. Application Data

(60) Provisional application No. 61/086,034, filed on Aug. 4, 2008.

(51) Int. Cl.
| | |
|---|---|
| *G06Q 20/20* | (2012.01) |
| *G06Q 20/32* | (2012.01) |
| *G06Q 20/40* | (2012.01) |
| *G06Q 30/06* | (2012.01) |
| G06Q 20/04 | (2012.01) |
| H04B 1/30 | (2006.01) |
| H04B 1/28 | (2006.01) |
| H04B 1/18 | (2006.01) |

(52) U.S. Cl.
CPC .............. *G06Q 20/20* (2013.01); *G06Q 20/204* (2013.01); *G06Q 20/32* (2013.01); *G06Q 20/3223* (2013.01); *G06Q 20/40* (2013.01); *G06Q 30/06* (2013.01)

(58) Field of Classification Search
USPC .............. 705/17, 21, 39, 44, 71; 342/357; 455/414
See application file for complete search history.

(56) References Cited

U.S. PATENT DOCUMENTS

| | | | | |
|---|---|---|---|---|
| 2005/0246253 | A1* | 11/2005 | Barthelemy | 705/35 |
| 2006/0287004 | A1* | 12/2006 | Fuqua | 455/558 |
| 2007/0022058 | A1* | 1/2007 | Labrou et al. | 705/67 |
| 2007/0026826 | A1* | 2/2007 | Wilson | 455/130 |
| 2007/0156436 | A1* | 7/2007 | Fisher et al. | 705/1 |
| 2008/0010190 | A1* | 1/2008 | Rackley, III et al. | 705/39 |
| 2009/0055278 | A1* | 2/2009 | Nemani | 705/17 |
| 2009/0171842 | A1* | 7/2009 | Blythe | 705/44 |
| 2009/0281904 | A1* | 11/2009 | Pharris | 705/17 |

* cited by examiner

*Primary Examiner* — Matthew Gart
*Assistant Examiner* — Reva R Danzig
(74) *Attorney, Agent, or Firm* — Hartman & Citrin LLC

(57) ABSTRACT

Systems and methods for handling point-of-sale transactions using a mobile device are provided herein. In one embodiment, a method for providing payment via a mobile device in a transaction for a good or service can include receiving a selection on the mobile device of a transaction account from which to fund payment in a transaction for a good or service. The method can further include generating and sending a notification to a network processing system (NPS). The notification can identify the selected transaction account. The NPS can be configured to associate the selected transaction account with an NPS account for one or more future transactions. The method can further include sending a customer identifier to a point-of-sale (POS) system via a short-range communications medium to complete the transaction. In another embodiment, methods for handling payment in a mobile e-commerce network are provided.

27 Claims, 11 Drawing Sheets

SYSTEMS AND METHODS FOR HANDLING POINT-OF-SALE TRANSACTIONS USING A MOBILE DEVICE

CROSS-REFERENCE TO RELATED APPLICATION

This application claims priority to U.S. Provisional Patent Application Number 61/086,034, filed Aug. 4, 2008, entitled "Systems and Methods for Mobile E-Commerce," which is incorporated herein by reference in its entirety.

TECHNICAL FIELD

The present disclosure relates generally to point-of-sale transactions and, more particularly, to systems and methods for handling point-of-sale transactions using a mobile device.

BACKGROUND

In recent years many consumers have adopted electronic forms of payment. Credit cards and debit cards are often used for the convenience and ease of use these payment forms provide over paper forms, such as cash and checks.

Credit cards are now being offered with built-in technology to allow for contactless transactions. For example, a consumer can swipe or tap their credit card at a designated credit card reader to complete a transaction. Each of the major credit card companies offer credit cards with this feature.

SUMMARY

In one embodiment of the present disclosure, a mobile device includes an application configured to allow selection of a transaction account to use for payment of items or services provided by a merchant, a transceiver configured to communicate with a network processing system (NPS) to send a notification that identifies the selected transaction account, and a short-range communications module (SRCM) configured to communicate, via a short-range communications medium, with a point-of-sale (POS) system that receives a customer identifier, in order to complete a transaction.

In some embodiments, the transaction account is one of a bank account, a checking account, a savings account, a money market account, a stock account, a mutual fund account, a bond account, a debit account, a points account, a charge account, a credit card account, a mortgage loan account, a line of credit account, a home equity line of credit account, a gift card account, a prepaid monetary card account, and a merchant-specific account.

In some embodiments, the application is further configured to allow transaction account management, such as, but not limited to, adding, deleting, updating, or otherwise managing transaction accounts from the application.

In some embodiments, the SRCM is one of a near-field communications (NFC) module, a radio frequency identification (RFID) module, an infrared (IR) module, barcode, and a BLUETOOTH® module.

In some embodiments, the SRCM is attached to the case of the mobile device. In other embodiments, the SCRM is molded into a portion of the mobile device case, such as a battery cover. In other embodiments, the SCRM is embedded in the mobile device. In other embodiments, the SRCM is included in the SIM card or removable media.

In some embodiments, the SRCM is a stand-alone module. In other embodiments, the SRCM is an integrated module.

In another embodiment of the present disclosure, a method for operating a mobile device to complete transaction can include receiving a selection, on the mobile device, of a transaction account from which to fund the transaction, and generating and sending a notification to an NPS, wherein the notification identifies the selected transaction account. The NPS can be configured to associate the selected transaction account with an NPS account for one or more future transactions. The method can further include sending a customer identifier to a POS system via a short-range communications medium in order to complete the transaction.

In some embodiments, the customer identifier is one of a telephone number, an IMSI, an IMEI, a virtual account number, a transaction account number, indicia provided by a customer, indicia provided by a merchant, indicia provided by the NPS, indicia provided by a wireless service provider, indicia provided by a wireline service provider, and indicia provided by a third-party. As used herein, indicia includes marks, words, names, numbers, images, data, electronic files of any kind, voiceprints, biometrics, dates, combinations thereof, and the like, used to uniquely identify a customer or create a customer identifier.

In another embodiment of the present disclosure, a method for handling payment in a mobile e-commerce network can include storing, in an account repository of an NPS, one or more transaction accounts associated with a customer identifier, and receiving, at the NPS, a notification identifying a transaction account selection. The transaction account selection can designate one of the transaction accounts for use in one or more future transactions. The method can further include receiving the customer identifier from a POS system in a request to use the designated transaction account to complete a transaction. Default rules can be applied if a user is out of cell coverage for communication between the mobile device and the NPS.

In some embodiments, the method can further include sending transaction account information for the designated transaction account to the POS system for payment processing.

In some embodiments, the method can further include authorizing payment for the transaction using the designated transaction account with a financial institution associated with the designated transaction account.

In some embodiments, the method can further include sending a confirmation to the POS system to confirm that payment for the transaction has been authorized.

In some embodiments, the method can further include sending account information for the designated transaction account to the POS system for forwarding to a financial institution gateway for payment processing.

In another embodiment of the present disclosure, a method for handling payment in a mobile e-commerce network can include storing, in an account repository of an NPS, one or more transaction accounts associated with a customer identifier, receiving, at the NPS, a notification that identifies a transaction account selection that designates a transaction account for use in one or more future transactions. The method can further include receiving the customer identifier from a financial institution gateway in a request to use the designated transaction account to complete a transaction, and authorizing payment for the transaction using the designated transaction account with a financial institution associated with the designated transaction account.

In another embodiment of the present disclosure, a method for providing payment in an e-commerce network can include receiving, at a NPS, a customer identifier from a POS system, the customer identifier first being sent from a mobile device to the POS system for payment in a transaction for an item or service. The method can further include determining, at the NPS, from the customer identifier, a telephone number associated with the mobile device and sending a message to the mobile device requesting authorization to charge a selected account. The method can further include receiving, at the NPS, a response message from the mobile device, wherein the response message includes an account selection. The method can further include authorizing payment with a financial institution identified by the account selection and sending the customer identifier to the POS with confirmation of a successful payment.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
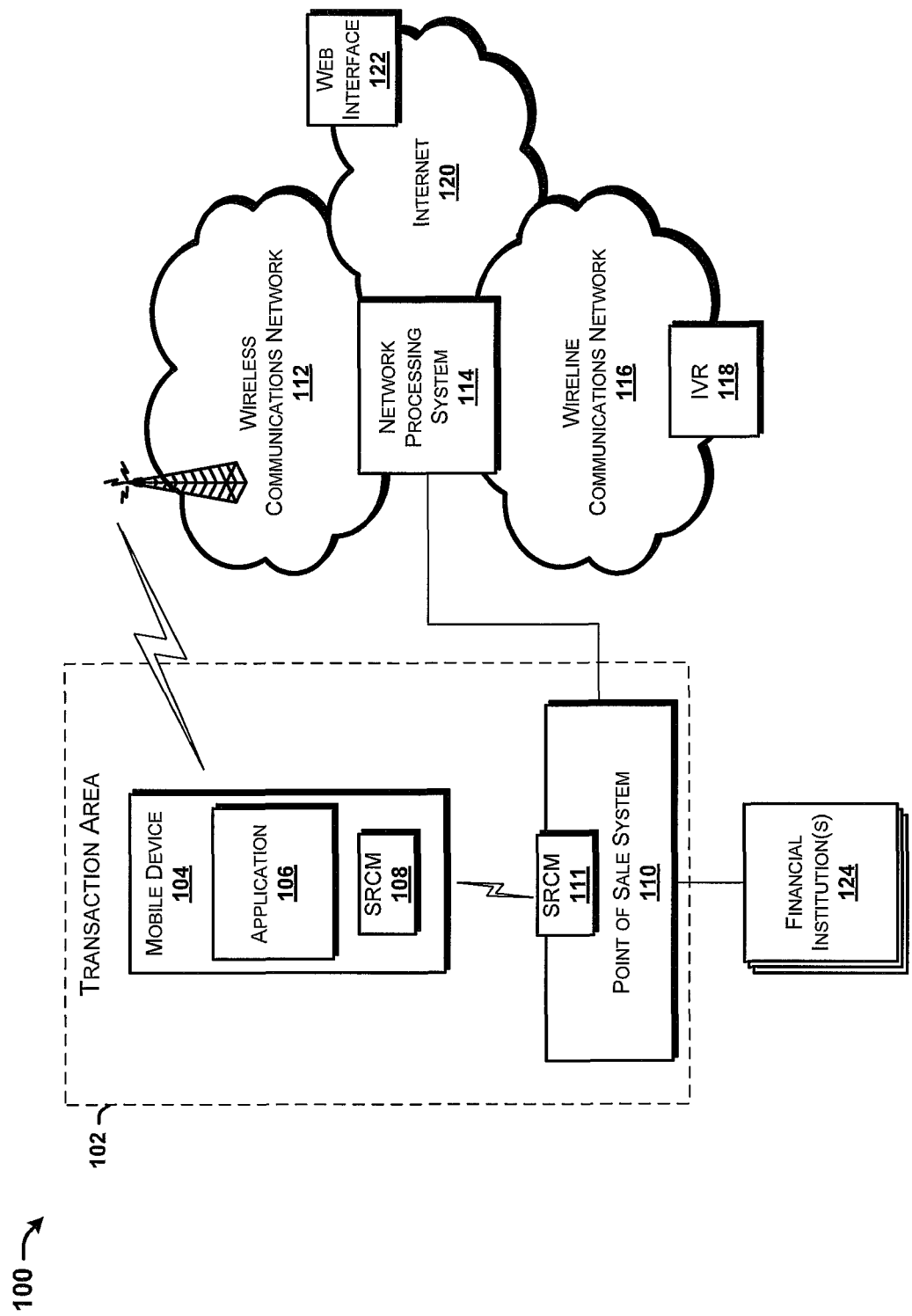
FIG. 1 schematically illustrates a mobile e-commerce network, according to an exemplary embodiment of the present disclosure.

Referring now to the drawings, wherein like numerals represent like elements throughout the drawings, FIG. 1 illustrates a mobile e-commerce network 100, according to an exemplary embodiment of the present disclosure. The illustrated mobile e-commerce network 100 includes a transaction area 102 in which a transaction can be handled, for example, between a merchant and a customer. The illustrated transaction area 102 includes a mobile device 104 that can be operated by a customer to pay for items and/or services provided by a merchant. The mobile device 104 can include an application 106 that can be configured to allow the customer to select a transaction account to use for payment of items and/or services provided by the merchant. Generally, the application 106 can include routines, program modules, programs, components, data structures, and the like. The application 106 can be stored in a memory of the mobile device 104 and can be executed by a mobile device processor. An exemplary mobile device 104 and detailed components thereof is illustrated and described with reference to FIG. 11.

The application 106 can include one or more transaction accounts including, but not limited to, a bank account, a checking account, a savings account, a money market account, a stock account, a mutual fund account, a bond account, a debit account, a points account, a charge account, a credit card account, a mortgage loan account, a line of credit account, a home equity line of credit account, a gift card account, a prepaid monetary card account, a merchant-specific account, any combination thereof, and the like. The application 106 can allow the customer to add, delete, update, or otherwise manage transaction accounts.

The mobile device 104 can further include a short-range communications module (SRCM) 108, such as, but not limited to, a near-field communications (NFC) module, a radio frequency identification (RFID) module, an infrared (IR) module, a BLUETOOTH® module, any combination thereof, and the like. By way of example and not limitation, the SRCM 108 can include a receiver and/or transmitter, a secure element, and an antenna. The SRCM 108 can be attached to the mobile device 104, such as by using an adhesive. Alternatively, the SRCM 108 can be molded into a portion of the mobile device case (e.g., a battery cover), or embedded in the mobile device 104. The SRCM 108 can be a stand-alone module. As a stand-alone module the SRCM 108 is not operatively linked and in communication with the mobile device electronics. Alternatively, the SRCM 108 can be operatively linked and in communication with the mobile device electronics.

The illustrated transaction area 102 further includes a point of sale (POS) system 110 that is illustrated as being operatively linked and in communication with the mobile device 104 via the respective SRCM's 108, 111 to exchange transaction.

The mobile e-commerce network 100 further includes a wireless communications network 112. The wireless communications network 112 can provide access to a network processing system (NPS) 114 via wireless access technologies, such as, but not limited to, GSM (Global System for Mobile communications), CDMA (Code Division Multiple Access), UMTS (Universal Mobile Telecommunications System) network, and provide data communications via EDGE (Enhanced Data rate for Global Evolution), the HSPA (High-Speed Packet Access) protocol family, such as, HSDPA (High-Speed Downlink Packet Access), EUL (Enhanced Uplink) or otherwise termed HSUPA (High-Speed Uplink Packet Access), HSPA+ (Evolved HSPA), WIFI®, WIMAX™, combinations thereof, and the like, for example. The wireless communications network 112 is also compatible with future wireless technologies including, but not limited to, pre-4G and 4G standards, for example. Other wireless access technologies are contemplated.

The mobile device 104 can receive a transaction account selection and send a notification to the NPS 114 to inform the NPS 114 that a transaction should be charged to the selected account. It is contemplated that an account selection can be made manually by the customer or automatically. An exemplary NPS 114 is described below with reference to FIG. 2.

Rules can be defined to permit or restrict use of one or more transaction accounts. Rules can be defined by the customer, the merchant, a wireless communications network provider, or another party, such as a vendor providing the NPS 114, for example. The rules can be executed by the application 106 for local mobile device rules, or by the NPS 114 for network and/or transaction account rules, for example.

Rules can be defined for a default account. A default account rule can identify the transaction account that is to be charged by default unless the customer intervenes and selects an alternate account, or if a selected account is declined. The default account rule can be disabled thereby requiring the customer to select a transaction account. Rules can be defined to restrict monetary value of transactions to a maximum and/or a minimum amount. A maximum amount or a minimum amount can be associated with a single account or multiple accounts, or can be global for all accounts.

Rules can be defined to use specific accounts for transactions following pre-defined thresholds. For example, a rule can be defined to use a first account if a transaction is below X dollars and to use a second account if the transaction is above X dollars. Rules can be defined for temporal permissions or restrictions on use of an account after account selection. For example, after account selection a transaction can be required to be completed within Y minutes or the customer can be required to select a transaction account. By alternative example, a selected account can remain active for a time period for an unlimited or a limited number of transactions. By alternative example, a selected account can be used for Z transactions after which the customer can be required to select a transaction account.

It is contemplated that default rules can be set for instances in which wireless coverage is unavailable and the mobile device 104 and NPS 114 are unable to communicate. Default rules can include, for example, a default account to use for all transactions if communication is unavailable or otherwise compromised.

The NPS 114 is also illustrated as being in communication with a wireline communications network 116. The wireline communications network 116 can utilize circuit-switched technologies, such as plain old telephone service (POTS), for example.

An interactive voice response (IVR) system 118 is also illustrated. The IVR system 118 can provide access to transaction account management functions provided by the NPS 114. For example, a customer can use the IVR system 118 to add, delete, update, and otherwise manage transaction accounts. Any changes can be sent to the mobile device 104 and updated on the application 106.

The NPS 114 is also illustrated as being in communication with the Internet 120. A web interface 122 can provide access to transaction account management functions provided by the NPS 114. For example, a customer can use the web interface 122 to add, delete, update, and otherwise manage transaction accounts. The web interface 122 can be a website or a web application, for example. The web interface 122 can be accessed by an Internet-capable device, such as a computer or the mobile device 104, for example.

A transaction account can be established with a financial institution 124, such as a bank, a broker, a credit card company, and the like. The POS system 110 can communicate with a financial institution 124 to receive authorization and/or payment for a given transaction.

Figure 2:
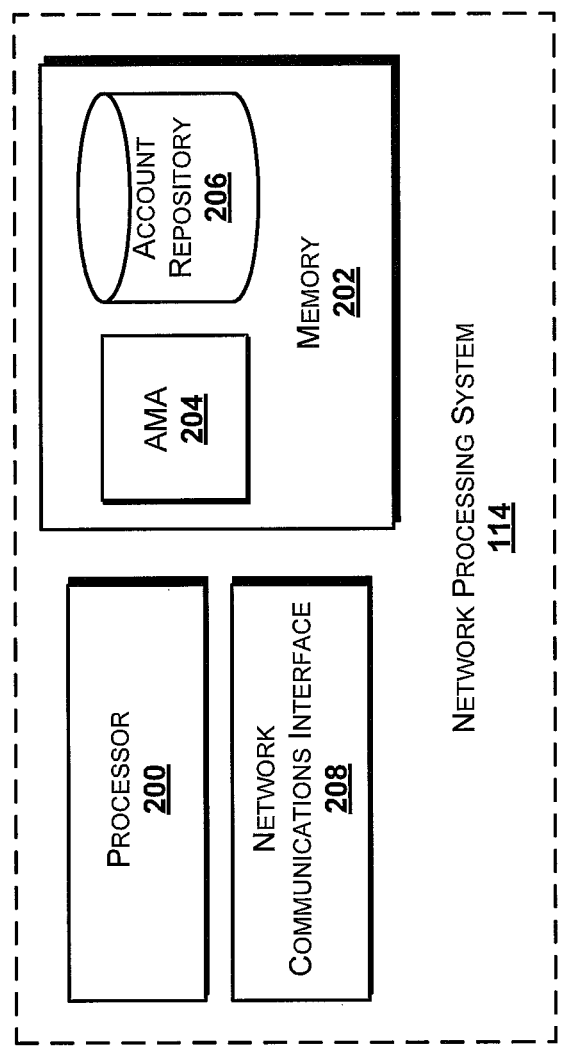
FIG. 2 schematically illustrates a network processing system, according to an exemplary embodiment of the present disclosure.

Referring now to FIG. 2, the NPS 114 is schematically illustrated, according to an exemplary embodiment of the present disclosure. The illustrated NPS 114 includes a processor 200 and a memory 202. The memory 202 can be configured to store an account management application 204 (AMA), that can be executable by the processor 200 to perform account management functions, such as with one or more NPS accounts stored in an account repository 206 and associated with a unique customer identifier. Each wireless service customer, for example, can be assigned an NPS account. The NPS 114 can further include a communications interface 208 for communicating with the POS system 110, the wireless communications network 112, the wireline communications network 116, the IVR system 118, the Internet 120, the web interface 122, the financial institutions 124, or any other network, or network element, for example.

An NPS account can be identified by a unique customer identifier, such as, but not limited to, a telephone number, an International Mobile Subscriber Identity (IMSI), an International Mobile Equipment Identity (IMEI), a virtual or soft account number, a transaction account number, a number provided by the customer, a number provided by the merchant, a number provided by the NPS 114, a number provided by a wireless service provider, a number provided by a wireline service provider, a social security number, any combination thereof, and the like.

A method for handling a mobile e-commerce payment in accordance with the embodiment illustrated in FIG. 1 is described herein below with reference to FIG. 6.

Figure 3:
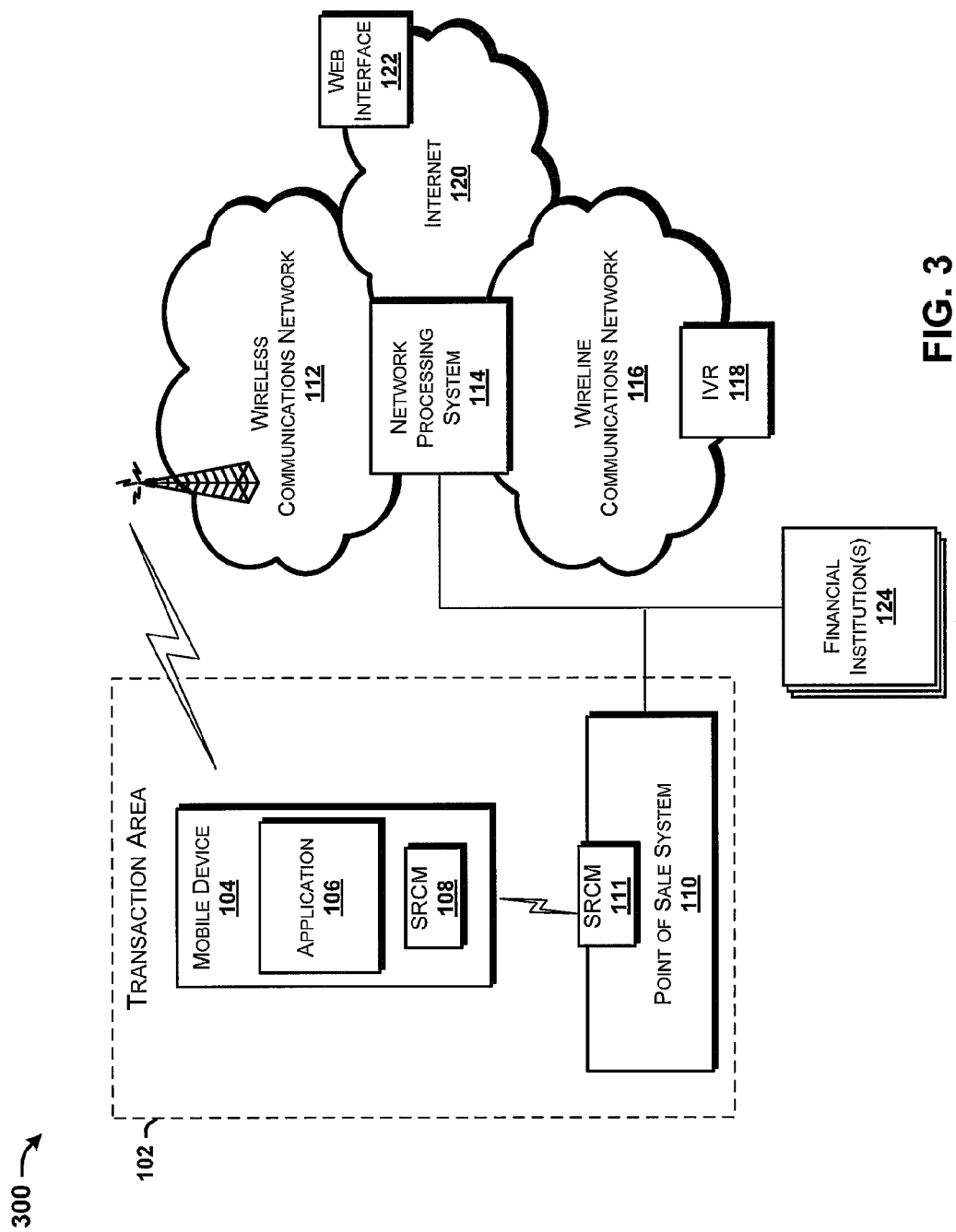
FIG. 3 schematically illustrates a mobile e-commerce network, according to another exemplary embodiment of the present disclosure.

Referring now to FIG. 3, a mobile e-commerce network 300 is schematically illustrated, according to another exemplary embodiment of the present disclosure. The mobile e-commerce network 300 includes the same elements as described above with reference to the mobile e-commerce network 100. In mobile e-commerce network 300, however, the financial institution 124 is illustrated as being in direct communication with the NPS 114. Further, in the illustrated embodiment, the POS system 110 can communicate with the NPS 114 and/or the financial institution(s) 124. For example, the exemplary method described below with reference to FIG. 10 enables communication only between the POS system 110 and the NPS 114. Other embodiments, however, permit communication between the POS system 110 and the financial institution(s) 124. Another method for handling a mobile e-commerce payment in accordance with this embodiment of the present disclosure is described herein below with reference to FIG. 7.

Figure 4:
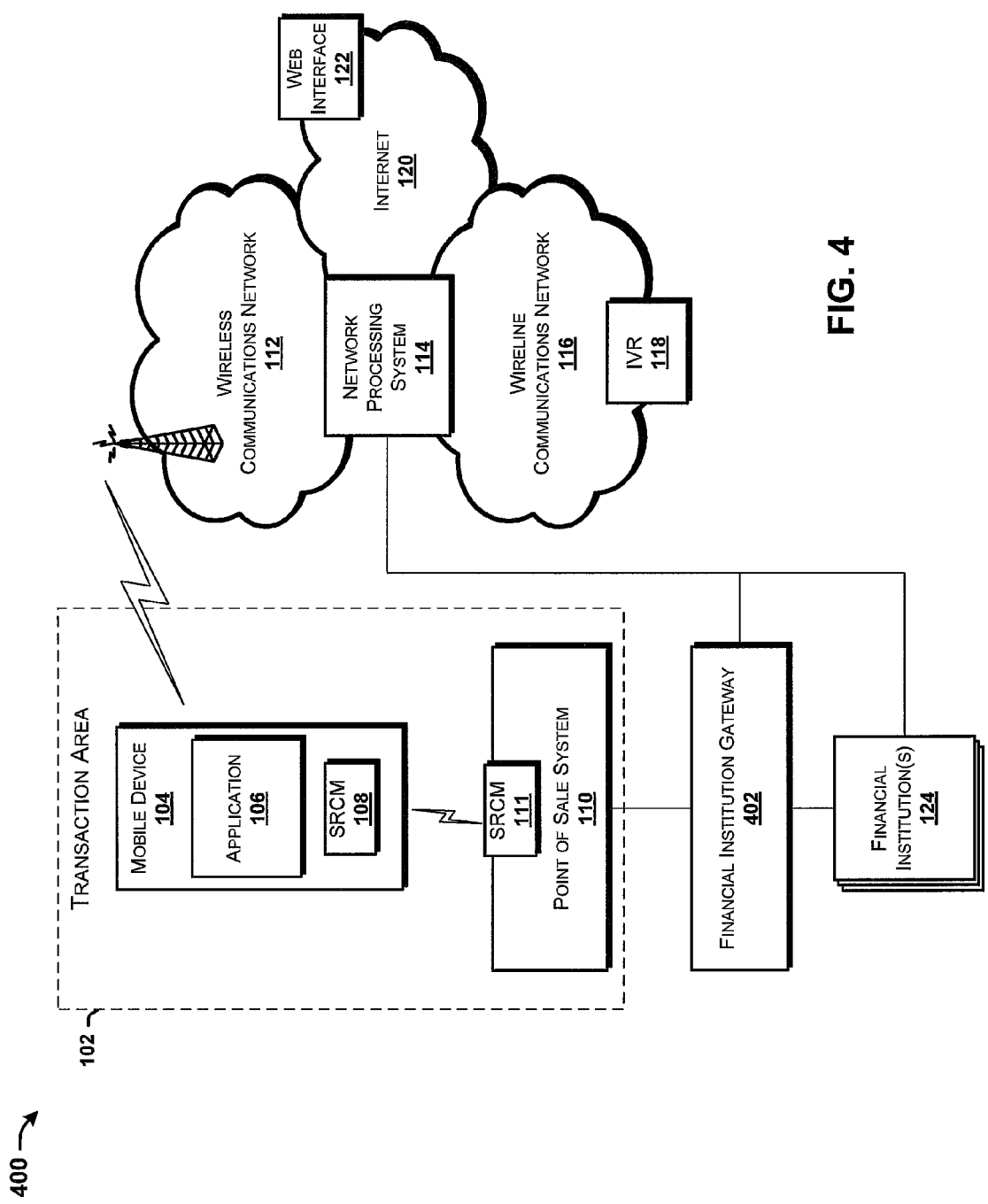
FIG. 4 schematically illustrates a mobile e-commerce network, according to another exemplary embodiment of the present disclosure.

Referring now to FIG. 4, a mobile e-commerce network 400 is schematically illustrated, according to another exemplary embodiment of the present disclosure. The mobile e-commerce network 400 includes the same elements as mobile e-commerce network 100. In addition, the mobile e-commerce network 400 includes a financial institution gateway 402 that is configured as a payment proxy between the POS system 110 and the financial institutions 124. The financial institution gateway 402 provides a single communication point for the POS system 110 with multiple financial institutions instead of having to maintain multiple communication points to individual financial institutions 124. In the illustrated embodiment, the financial institution gateway 402 is in communication with the NPS 114. A method for handling a mobile e-commerce payment in accordance with this embodiment of the present disclosure is described herein below with reference to FIG. 8.

Figure 5:
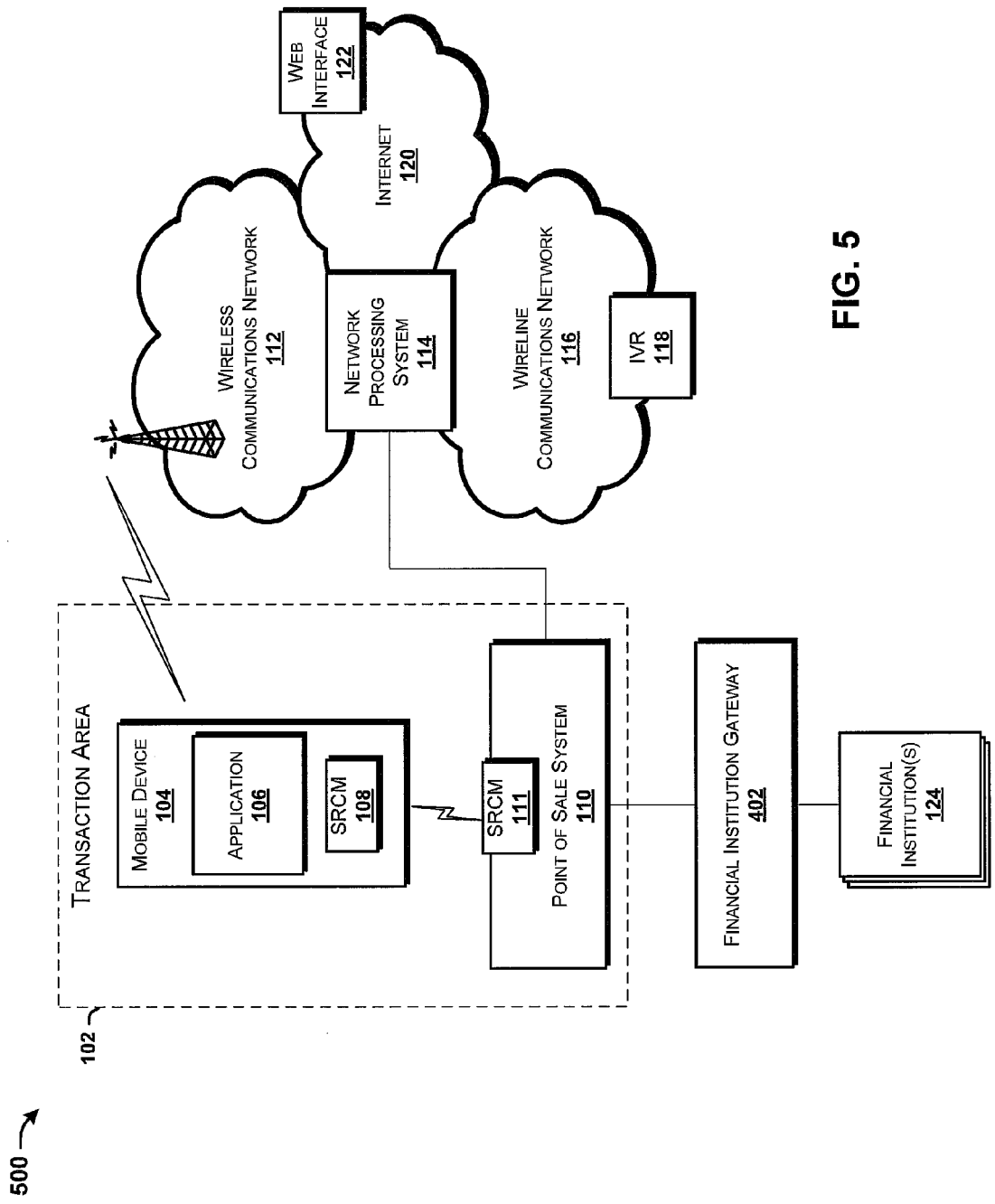
FIG. 5 schematically illustrates a mobile e-commerce network, according to another exemplary embodiment of the present disclosure.

Referring now to FIG. 5, a mobile e-commerce network 500 is schematically illustrated, according to another exemplary embodiment of the present disclosure. The mobile e-commerce network 500 includes the same elements as mobile e-commerce network 400. In this alternative configuration, the POS system 110 is in communication with the NPS 114 and the financial institution gateway 402 instead of being solely in communication with the financial institution gateway 402. A method for handling a mobile e-commerce payment in accordance with this embodiment of the present disclosure is described herein below with reference to FIG. 9.

Figure 6:
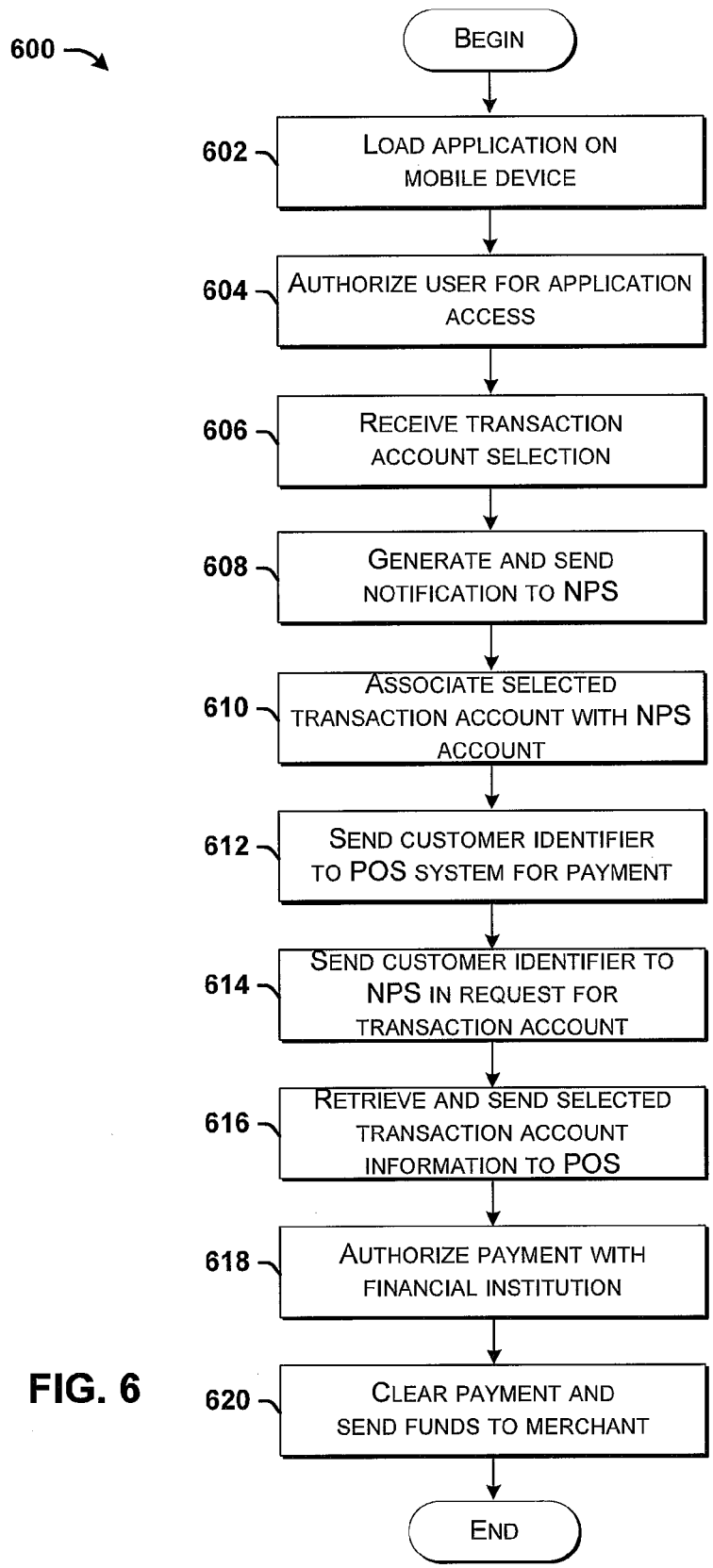
FIG. 6 schematically illustrates a method for handling a mobile e-commerce payment, according to an exemplary embodiment of the present disclosure.

FIG. 6 schematically illustrates a method 600 for handling a mobile e-commerce payment, according to an exemplary embodiment of the present disclosure. The method 600 is described below with reference to FIG. 1. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

The method 600 begins and flow proceeds to block 602, wherein the application 106 is loaded on the mobile device 104. It is contemplated that the application 106 can be updated manually or automatically via a wireless data connection, for example. Transaction accounts can be added, deleted, updated, or otherwise managed from the mobile device 104 via the application 106, from the web interface 122, or the IVR 118, for example. The web interface 122, for example, can be a web site for a financial institution that can provide an option to send account information to the application 106. An agreement may be required prior to a user being authorized to access account information from the application 106. Security and authorization techniques, such as passwords, image verification, tokens, voiceprints, biometric authorization, personal identification numbers (PIN), and the like can be used to authorize a user to send account information to the application 106.

At block 604, the application 106 can require user authorization via one or more security and authorization techniques, such as those described immediately above. An authorized user can access transaction accounts that are currently available in the application 106. A second authorization can be required for a user to add, delete, update, or otherwise manage transaction accounts. In some embodiments, a financial institution can require log-in information, such as a user name and password to access the transaction account from the application 106. A user can be required to manually enter authorization information, such as user names and passwords. Authorization information can be saved on the mobile device 104. An auto-completion feature can be used to automatically populate required authorization fields that would otherwise require manual entry.

At block 606, the mobile device 104 can receive a transaction account selection. As per the rules described above, a default transaction account can be used unless the user intervenes and selects an alternate account, or if a selected account is declined. The application 106 can be configured to first check if a default account has been assigned prior to requesting the user to input a transaction account selection. The application 106 can also automatically select a default account based upon the transaction amount.

At block 608, the application 106 can generate and send a notification to the NPS 114 to notify the NPS 114 of the selected account. The notification can include, for example, a unique customer identifier, such as described above, to identify the NPS account that is associated with the customer. The notification can be sent to the NPS 114 via the wireless communications network 112 or via the Internet 120, for example.

At block 610, the NPS 114 can associate the selected transaction account with the NPS account as identified by the customer identifier. The NPS 114 can send a confirmation (not shown) to the mobile device 104 confirming that the notification has been received and provisioning of the selected account for one or more future transactions.

The transaction account can be queued for one or more future transactions in accordance with any previously defined rules. After the transaction account is used for the specified number of transactions, future transactions can be declined. Temporal restrictions can be imposed on use of the selected account such that after a time-out period expires future transactions can be declined. In some embodiments, rules are defined prior to an account being selected. In other embodiments, rules are defined when an account is selected.

At block 612, the mobile device 104 sends the unique customer identifier to the POS system 110 for payment. At block 614, the POS system 110 receives the customer identifier and sends a request to the NPS 114. The request can include the customer identifier and can be directed to the NPS account that is associated with the customer identifier to retrieve the previously selected transaction account.

At block 616, the NPS 114 receives the request, retrieves transaction account information for the transaction account selected in block 606, and sends the transaction account information to the POS system 110. At block 618, the POS system 110 receives the transaction account information and sends an authorization request to the financial institution 124 that is associated with the transaction account information returned in block 616, and the payment can be authorized. At block 620, the payment can clear and the merchant can receive funds from the financial institution 124. Payment can occur simultaneously with authorization or at a later time, for example. The method 600 can end.

Figure 7:
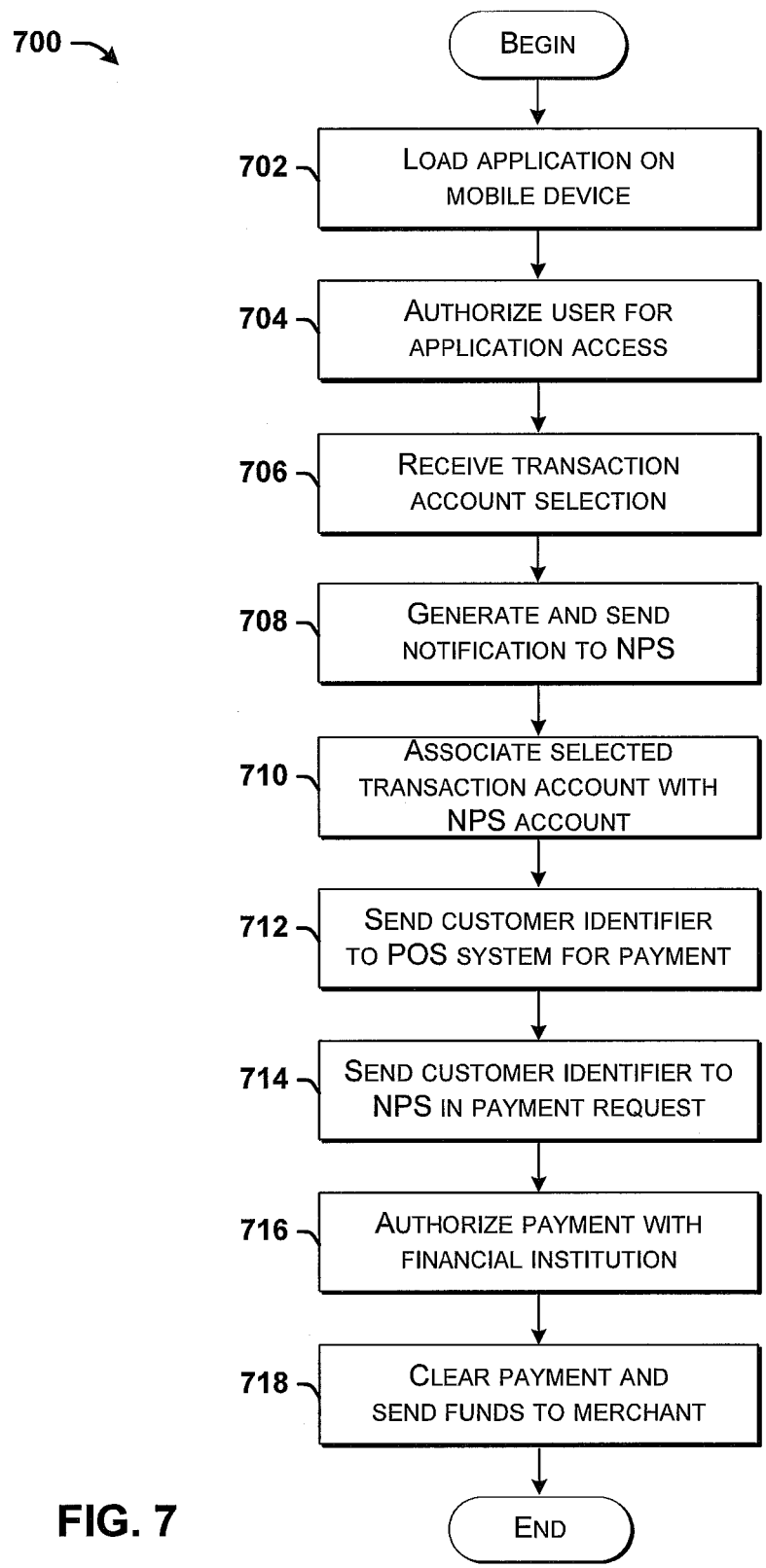
FIG. 7 schematically illustrates a method for handling a mobile e-commerce payment, according to another exemplary embodiment of the present disclosure.

FIG. 7 schematically illustrates a method 700 for handling a mobile e-commerce payment, according to another exemplary embodiment of the present disclosure. The method 700 is described below with reference to FIG. 3. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The method 700 begins and flow proceeds to block 702, wherein the application 106 is loaded on the mobile device 104. It is contemplated that the application 106 can be updated manually or automatically via a wireless data connection, for example. Transaction accounts can be added, deleted, updated, or otherwise managed from the mobile device 104 via the application 106, from the web interface 122, or the IVR 118, for example. The web interface 122, for example, can be a web site for a financial institution that can provide an option to send account information to the application 106. An agreement may be required prior to a user being authorized to access account information from the application 106. Security and authorization techniques, such as passwords, image verification, tokens, voiceprints, biometric authorization, PIN, and the like can be used to authorize a user to send account information to the application 106.

At block 704, the application 106 can require user authorization via one or more security and authorization techniques, such as those described immediately above. An authorized user can access transaction accounts that are currently available in the application 106. A second authorization can be required for a user to add, delete, update, or otherwise manage transaction accounts. In some embodiments, a financial institution can require log-in information, such as a user name and password to access the transaction account from the application 106. A user can be required to manually enter authorization information, such as user names and passwords. Authorization information can be saved on the mobile device 104. An auto-completion feature can be used to automatically populate required authorization fields that would otherwise require manual entry.

At block 706, the mobile device 104 can receive a transaction account selection. As per the rules described above, a default transaction account can be used unless the user intervenes and selects an alternate account, or if a selected account is declined. The application 106 can be configured to first check if a default account has been assigned prior to requesting the user to input a transaction account selection. The application 106 can also automatically select a default account based upon the transaction amount.

At block 708, the application 106 can generate and send a notification to the NPS 114 to notify the NPS 114 of the selected account. The notification can include, for example, a unique customer identifier, such as described above, to identify the NPS account that is associated with the customer. The notification can be sent to the NPS 114 via the wireless communications network 112 or via the Internet 120, for example.

At block 710, the NPS 114 can associate the selected transaction account with the NPS account as identified by the customer identifier. The NPS 114 can send a confirmation (not shown) to the mobile device 104 confirming the receipt of the notification and provisioning of the selected account for one or more future transactions.

The transaction account can be queued for one or more future transactions in accordance with any previously defined rules. After the transaction account is used for the specified number of transactions, future transactions can be declined. Temporal restrictions can be imposed on use of the selected account such that after a time-out period expires future transactions can be declined. In some embodiments, rules are defined prior to an account being selected. In other embodiments, rules are defined when an account is selected.

At block 712, the mobile device 104 sends the unique customer identifier to the POS system 110 for payment. At block 714, the POS system 110 receives the customer identifier and sends the customer identifier to the NPS 114 in a payment request. At block 716, the NPS 114 receives the payment request and communicates with the appropriate financial institution 124 to authorize the payment. The NPS 114 can send a confirmation (not shown) to the POS system 110 confirming that payment has been authorized. At block 718, payment can clear and the merchant can receive the funds from the financial institution 124. Payment can occur simultaneously with authorization or at a later time, for example. The method 700 can end.

Figure 8:
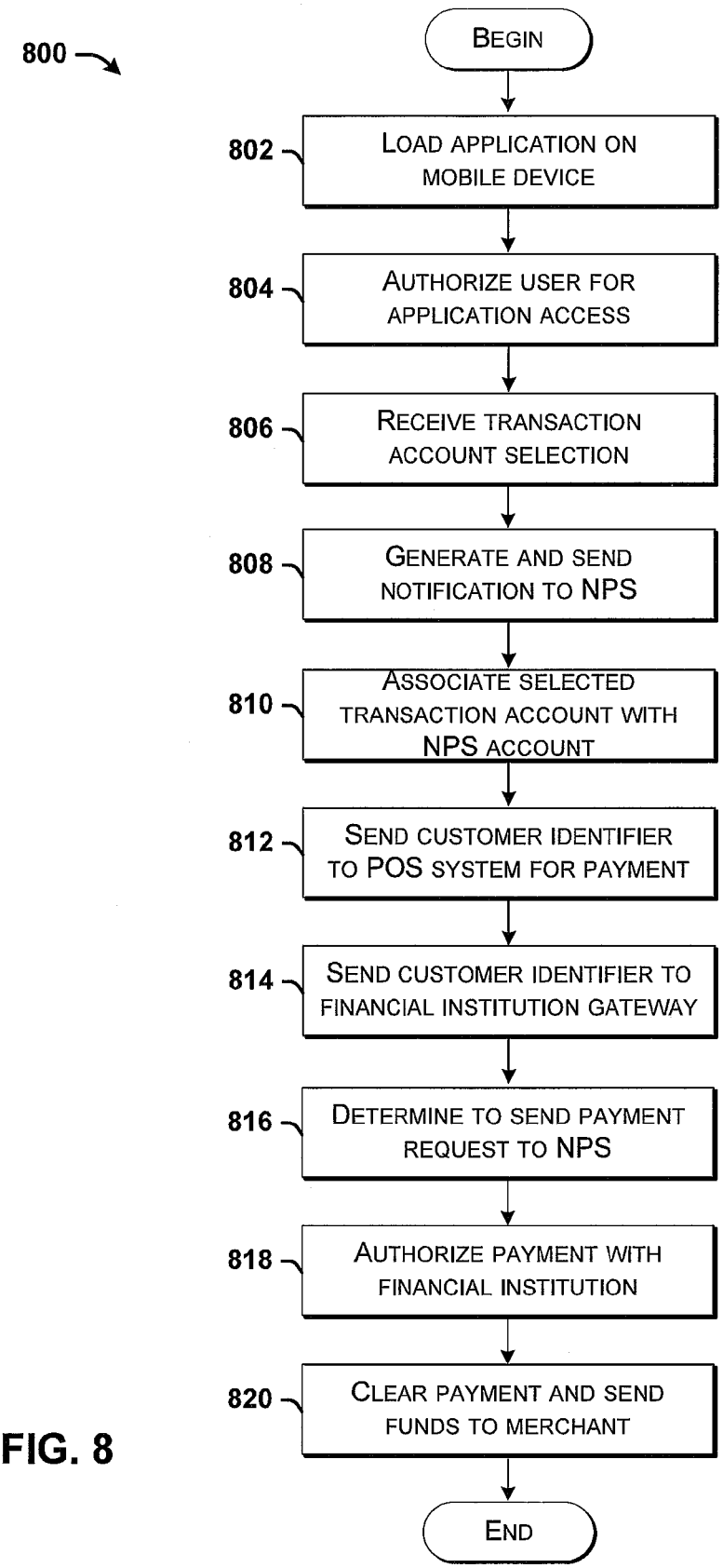
FIG. 8 schematically illustrates a method for handling a mobile e-commerce payment, according to another exemplary embodiment of the present disclosure.

FIG. 8 schematically illustrates a method 800 for handling a mobile e-commerce payment, according to another exemplary embodiment of the present disclosure. The method 800 is described below with reference to FIG. 4. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

The method 800 begins and flow proceeds to block 802, wherein the application 106 is loaded on the mobile device 104. It is contemplated that the application 106 can be updated manually or automatically via a wireless data connection, for example. Transaction accounts can be added, deleted, updated, or otherwise managed from the mobile device 104 via the application 106, from the web interface 122, or the IVR 118, for example. The web interface 122, for example, can be a web site for a financial institution that can provide an option to send account information to the application 106. An agreement may be required prior to a user being authorized to access account information from the application 106. Security and authorization techniques, such as passwords, image verification, tokens, voiceprints, biometric authorization, PIN, and the like can be used to authorize a user to send account information to the application 106.

At block 804, the application 106 can require user authorization via one or more security and authorization techniques, such as those described immediately above. An authorized user can access transaction accounts that are currently available in the application 106. A second authorization can be required for a user to add, delete, update, or otherwise manage transaction accounts. In some embodiments, a financial institution can require log-in information, such as a user name and password to access the transaction account from the application 106. A user can be required to manually enter authorization information, such as user names and passwords. Authorization information can be saved on the mobile device 104. An auto-completion feature can be used to automatically populate required authorization fields that would otherwise require manual entry.

At block 806, the mobile device 104 can receive a transaction account selection. As per the rules described above, a default transaction account can be used unless the user intervenes and selects an alternate account, or if a selected account is declined. The application 106 can be configured to first check if a default account has been assigned prior to requesting the user to input a transaction account selection. The application 106 can also automatically select a default account based upon the transaction amount.

At block 808, the application 106 can generate and send a notification to the NPS 114 to notify the NPS 114 of the selected account. The notification can include, for example, a unique customer identifier, such as described above, to identify the NPS account that is associated with the customer. The notification can be sent to the NPS 114 via the wireless communications network 112 or via the Internet 120, for example.

At block 810, the NPS 114 can associate the selected transaction account with the NPS account as identified by the customer identifier. The NPS 114 can send a confirmation (not shown) to the mobile device 104 confirming the receipt of the notification and provisioning of the selected account for one or more future transactions.

The transaction account can be queued for one or more future transactions in accordance with any previously defined rules. After the transaction account is used for the specified number of transactions, future transactions can be declined. Temporal restrictions can be imposed on use of the selected account such that after a time-out period expires future transactions can be declined. In some embodiments, rules are defined prior to an account being selected. In other embodiments, rules are defined when an account is selected.

At block 812, the mobile device 104 sends the unique customer identifier to the POS system 110 for payment. At block 814, the POS system 110 receives the customer identifier and sends the customer identifier to the financial institution gateway 402. At block 816, the financial institution gateway 402 determines to send a payment request to the NPS 114 based upon the customer identifier. At block 818, the NPS 114 receives the payment request and communicates with the financial institution 124 associated with the selected account to authorize the payment. The NPS 114 can send a confirmation (not shown) to the financial institution gateway 402 confirming that payment has been authorized. At block 820, payment can clear and the merchant can receive funds from the financial institution 124. Payment can occur simultaneously with authorization or at a later time, for example. The method 800 can end.

Figure 9:
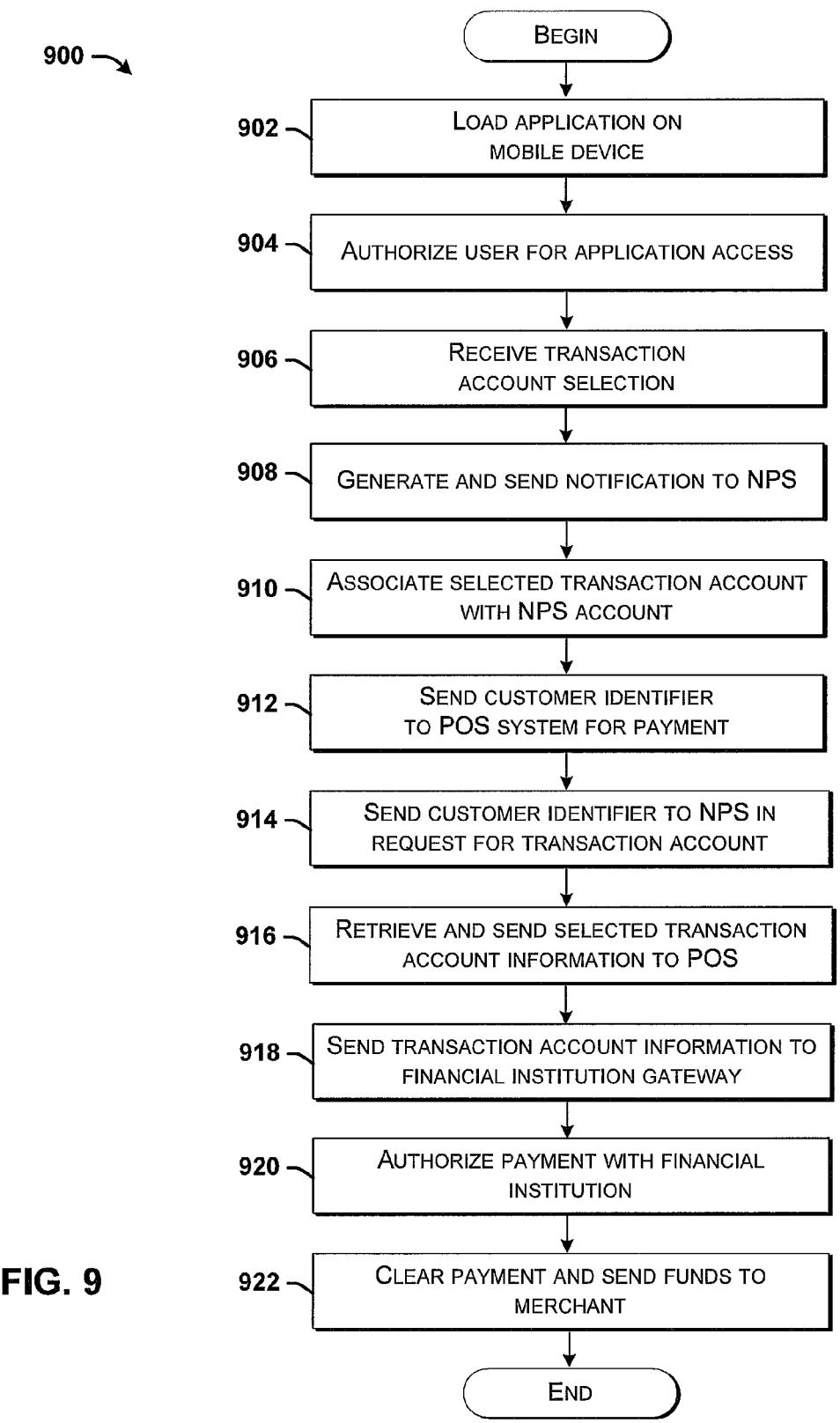
FIG. 9 schematically illustrates a method for handling a mobile e-commerce payment, according to another exemplary embodiment of the present disclosure.

FIG. 9 schematically illustrates a method 900 for handling a mobile e-commerce payment, according to another exemplary embodiment of the present disclosure. The method 900 is described below with reference to FIG. 5. It should be understood that the steps of the method 900 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 900 can be ended at any time. Some or all steps of this process, and/or substantially equivalent steps, can be performed by execution of computer-readable instructions included on a computer readable medium.

The method 900 begins and flow proceeds to block 902, wherein the application 106 is loaded on the mobile device 104. It is contemplated that the application 106 can be updated manually or automatically via a wireless data connection, for example. Transaction accounts can be added, deleted, updated, or otherwise managed from the mobile device 104 via the application 106, from the web interface 122, or the IVR 118, for example. The web interface 122, for example, can be a web site for a financial institution that can provide an option to send account information to the application 106. An agreement may be required prior to a user being authorized to access account information from the application 106. Security and authorization techniques, such as passwords, image verification, tokens, voiceprints, biometric authorization, PIN, and the like can be used to authorize a user to send account information to the application 106.

At block 904, the application 106 can require user authorization via one or more security and authorization techniques, such as those described immediately above. An authorized user can access transaction accounts that are currently available in the application 106. A second authorization can be required for a user to add, delete, update, or otherwise manage transaction accounts. In some embodiments, a financial institution can require log-in information, such as a user name and password to access the transaction account from the application 106. A user can be required to manually enter authorization information, such as user names and passwords. Authorization information can be saved on the mobile device 104. An auto-completion feature can be used to automatically populate required authorization fields that would otherwise require manual entry.

At block 906, the mobile device 104 can receive a transaction account selection. As per the rules described above, a default transaction account can be used unless the user intervenes and selects an alternate account, or if a selected account is declined. The application 106 can be configured to first check if a default account has been assigned prior to requesting the user to input a transaction account selection. The application 106 can also automatically select a default account based upon the transaction amount.

At block 908, the application 106 can generate and send a notification to the NPS 114 to notify the NPS 114 of the selected account. The notification can include, for example, a unique customer identifier, such as described above, to identify the NPS account that is associated with the customer. The notification can be sent to the NPS 114 via the wireless communications network 112 or via the Internet 120, for example.

At block 910, the NPS 114 can associate the selected transaction account with the NPS account as identified by the customer identifier. The NPS 114 can send a confirmation (not shown) to the mobile device 104 confirming the receipt of the notification and provisioning of the selected account for one or more future transactions.

The transaction account can be queued for one or more future transactions in accordance with any previously defined rules. After the transaction account is used for the specified number of transactions, future transactions can be declined. Temporal restrictions can be imposed on use of the selected account such that after a time-out period expires future transactions can be declined. In some embodiments, rules are defined prior to an account being selected. In other embodiments, rules are defined when an account is selected.

At block 912, the mobile device 104 sends the unique customer identifier to the POS system 110 for payment. At block 914, the POS system 110 receives the customer identifier and sends the customer identifier to the NPS 114 in a request for the transaction account to use to complete the transaction. At block 916, the NPS 114 receives the request, retrieves the transaction account information for the transaction account selected in block 906, and sends the transaction account information to the POS system 110.

At block 918, the POS system 110 can send the transaction account information received from the NPS 114 to the financial institution gateway 402. At block 920, the financial institution gateway 402 sends an authorization request to the financial institution 124 associated with the transaction account information. The payment is authorized. At block 922, payment can clear and the merchant can receive funds from the financial institution 124. Payment can occur simultaneously with authorization or at a later time, for example. The method 900 can end.

Figure 10:
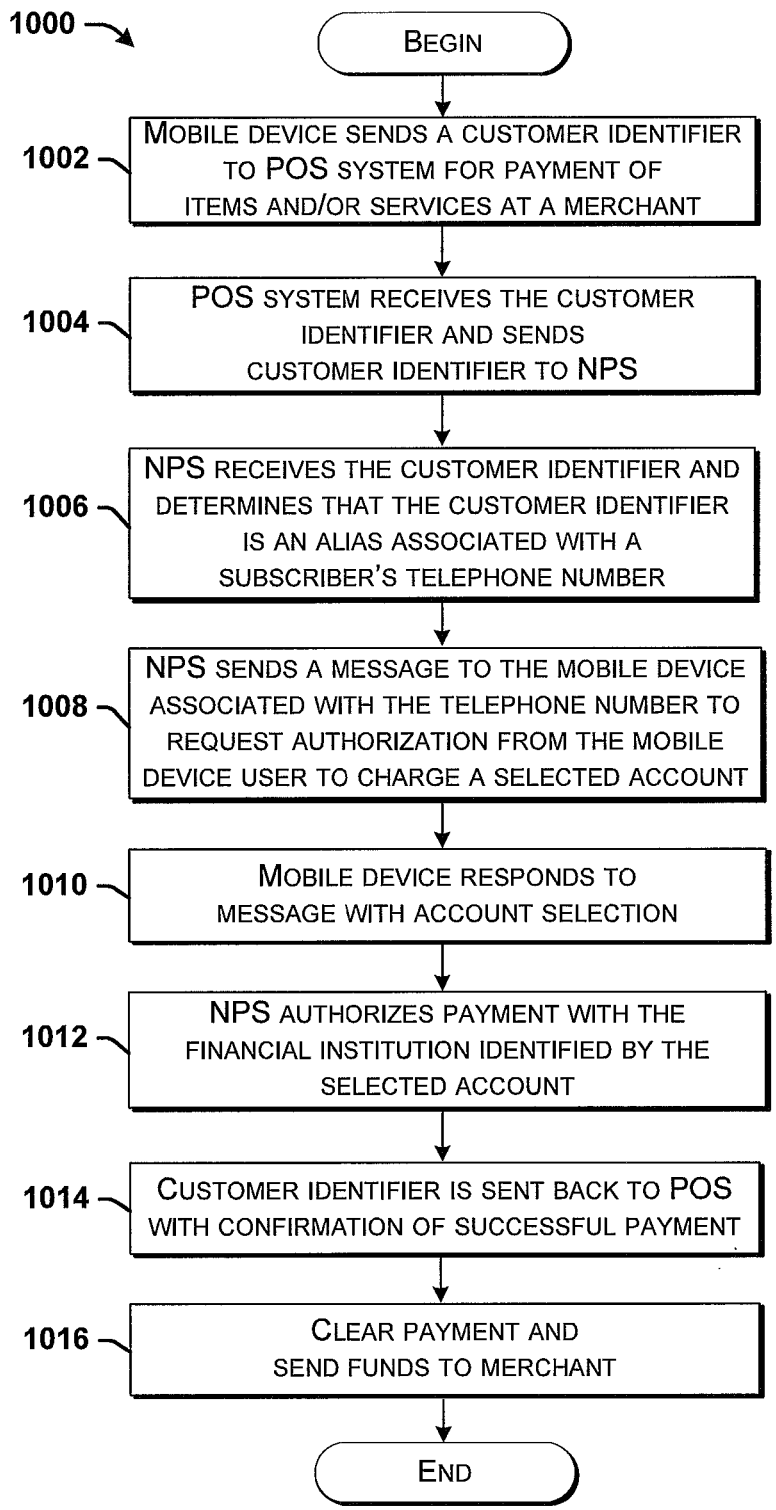
FIG. 10 schematically illustrates a method for handling a mobile e-commerce payment, according to another exemplary embodiment of the present disclosure.

Referring now to FIG. 10, a method 1000 for handling a mobile e-commerce payment is illustrated, according to another exemplary embodiment of the present disclosure. It should be understood that the steps of the method 1000 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1000 can be ended at any time. Some or all steps of this process, and/or substantially equivalent steps, can be performed by execution of computer-readable instructions included on a computer readable medium.

The method 1000 begins and flow proceeds to block 1002 wherein a mobile device 104 sends a unique customer identifier to the POS system 110 for payment of items and/or services provided by a merchant. At block 1004, the POS system 110 receives the customer identifier and sends the customer identifier to the NPS 114. At block 1006, the NPS 114 receives the customer identifier and determines that the customer identifier is an alias that is associated with a subscriber's telephone number (e.g. an MSISDN). At block 1008, the NPS 114 can generate and send a message to the mobile device that is identified by the telephone number. The message can include a request for the mobile device user to select an account to use for payment. The mobile device user can be required to enter a PIN or password prior to and/or after account selection for security. At block 1010, the mobile device can respond to the message with an account selection via a response message. At block 1012, the NPS 114 authorizes payment with the financial institution 124 identified by the selected account. At block 1014, the NPS 114 sends the customer identifier back to the POS system 110 with confirmation of successful payment. At block 1016, the financial institution 124 can clear payment and send funds to the merchant, for example, on a per transaction basis or batch process.

In some embodiments, the POS system 110 and NPS 114 communicate using only the customer identifier thereby eliminating any need to exchange private transaction account information (e.g. account numbers, passwords, etc.) between the POS system 110 and the NPS 114. By doing so, the POS system 110 is not burdened with the task of keeping track of customer identifier and transaction account information. In these embodiments, the NPS 114 exchanges transaction account information only with the financial institution for the selected account.

Figure 11:
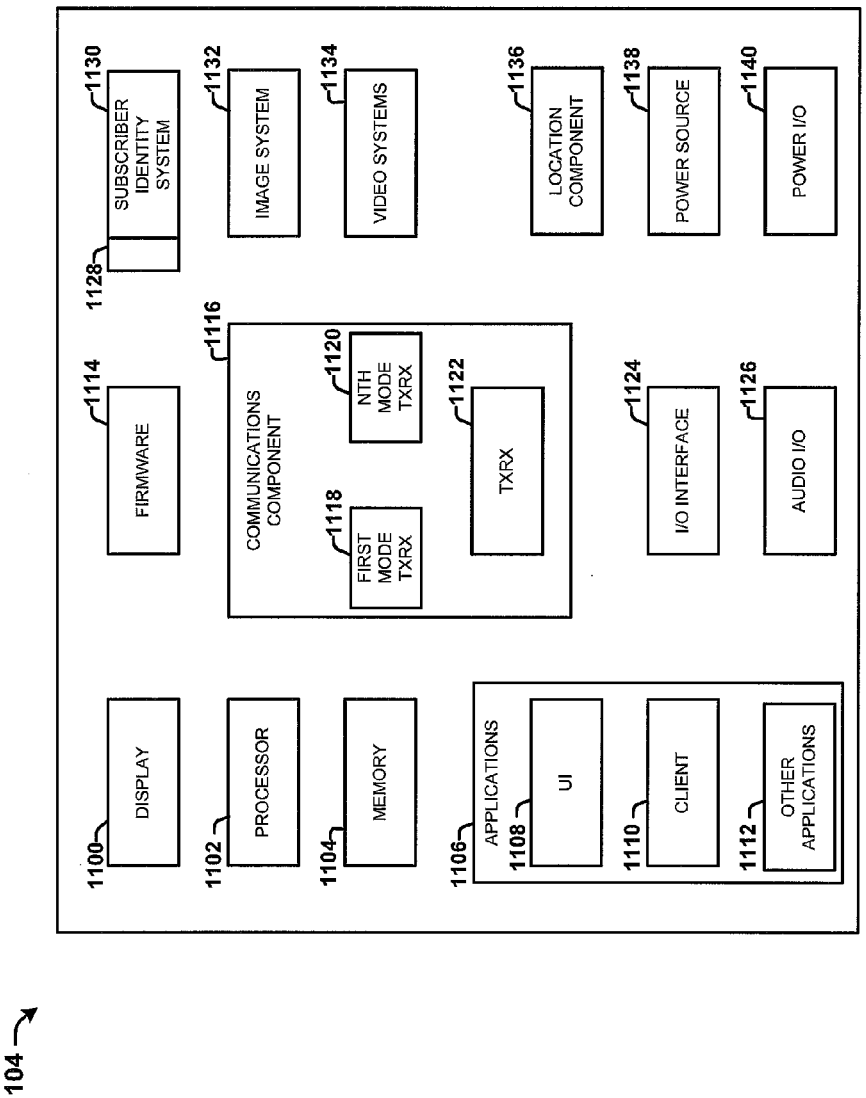
FIG. 11 schematically illustrates an exemplary device for use in accordance with exemplary embodiments of the present disclosure.

FIG. 11 illustrates a schematic block diagram of an exemplary device 104 for use in accordance with some exemplary embodiments of the present disclosure. Although no connections are shown between the components illustrated in FIG. 11, the components can interact with each other to carry out device functions.

The device 104 can be a multimode handset. It should be understood that FIG. 11 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 104 can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 104.

The device 104 can include a display 1100 for displaying multimedia such as, for example, text, images, video, telephony functions such as Caller ID data, setup functions, menus, music, metadata, messages, wallpaper, graphics, internet content, device status, preferences settings, map data, location data, and the like. The device 104 can include a processor 1102 for controlling, and/or processing data. A memory 1104 can interface with the processor 1102 for the storage of data and/or applications 1106. An application 1106 can include, for example, the application 106, web browsing software, mapping software, location determination software, location sharing software, video player software, audio playback software, music player software, email software, messaging software, combinations thereof, and the like. The application 1106 can also include a user interface (UI) application 1108. The UI application 1108 can interface with a client 1110 (e.g., an operating system) to facilitate user interaction with device functionality and data, for example, answering/initiating calls, entering/deleting data, location management systems, configuring settings, address book manipulation, multimode interaction, and the like. The applications 1106 can include other applications 1112 such as, for example, firmware, add-ons, plug-ins, voice recognition, call voice processing, voice recording, messaging, e-mail processing, video processing, image processing, voicemail file archival, converting, and forwarding, music play, combinations thereof, and the like, as well as subsystems and/or components. The applications 1106 can be stored in the memory 1104 and/or in a firmware 1114, and can be executed by the processor 1102. The firmware 1114 can also store code for execution during initialization of the device 104.

A communications component 1116 can interface with the processor 1102 to facilitate wired/wireless communications with external systems including, for example, cellular networks, location systems, VoIP networks, LAN, WAN, MAN, PAN, that can be implemented using WIFI®, WIMAX™, combinations and/or improvements thereof, and the like. The communications component 1116 can also include a multimode communications subsystem for providing cellular communications via different cellular technologies. For example, a first cellular transceiver 1118 can operate in one mode, for example, GSM, and an Nth transceiver 1120 can operate in a different mode, for example UMTS. While only two transceivers 1118, 1120 are illustrated, it should be appreciated that a plurality of transceivers can be included. The communications component 1116 can also include a transceiver 1122, for example, SRCM 108, for unlicensed communications using technology such as, for example, WIFI®, WIMAX™, BLUETOOTH®, infrared, IRDA, NFC, RF, and the like. The communications component 1116 can also facilitate communications reception from terrestrial radio networks, digital satellite radio networks, Internet-based radio services networks, combinations thereof, and the like. The communications component 1116 can process data from a network such as, for example, the Internet, a corporate intranet, a home broadband network, and the like, via an ISP, DSL provider, or broadband provider.

An input/output (I/O) interface 1124 can be provided for input/output of data and/or signals. The I/O interface 1124 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It should be appreciated that the I/O interface 1124 can be used for communications between the device and a network or local device, instead of, or in addition to, the communications component 1116.

Audio capabilities can be provided by an audio I/O component 1126 that can include a speaker for the output of audio signals and a microphone to collect audio signals. The device 104 can include a slot interface 1128 for accommodating a subscriber identity system 1130 such as, for example, a SIM or universal SIM (USIM). The subscriber identity system 1130 instead can be manufactured into the device 104, thereby obviating the need for a slot interface 1128. In some embodiments, the subscriber identity system 1130 can store certain features, rules, policies, and the like. The subscriber identity system 1130 can be programmed by a manufacturer, a retailer, a customer, a network operator, and the like.

The device 104 can include an image capture and processing system 1132. Photos and/or videos can be obtained via an associated image capture subsystem of the image system 1132, for example, a camera. The device 104 can also include a video component 1134 for processing, recording, and/or transmitting video content.

A location component 1136, can be included to send and/or receive signals such as, for example, GPS data, triangulation data, combinations thereof, and the like. The location component 1136 can interface with cellular network nodes, telephone lines, satellites, location transmitters and/or beacons, wireless network transmitters and receivers, for example, WIFI® hotspots, radio transmitters, combinations thereof, and the like. The device 104 can obtain, generate, and/or receive data to identify its location or can transmit data used by other devices to determine the device 104 location. In some embodiments, the device 104 uses a calendar or presence data to estimate or determine the location of the device 104. The device 104 can include a power source 1138 such as batteries and/or other power subsystem (AC or DC). The power source 1138 can interface with an external power system or charging equipment via a power I/O component 1140.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A mobile device comprising:
   a short-range communication module;
   a transceiver;
   a processor; and
   a memory that stores instructions that, when executed by the processor, cause the processor to perform operations comprising
      receiving a transaction account selection indicating a transaction account to be used to pay for a future transaction, wherein the transaction account is selected from a plurality of transaction accounts based upon a transaction amount of the future transaction,
      sending, to a network processing system using the transceiver, a notification that identifies
         the transaction account selection for the future transaction, and
         a unique customer identifier used by the network processing system to identify a network processing system account, wherein the unique customer identifier comprises a transaction account number and a number provided by a customer,
      receiving, from the network processing system, a confirmation that indicates that the transaction account selection has been associated with the network processing system account corresponding to the unique customer identifier, and
      sending, via a short-range communications medium using the short-range communication module, the unique customer identifier to a point of sale system associated with a merchant during the future transaction, wherein the point of sale system sends the unique customer identifier in a payment request to the network processing system to complete the future transaction using the transaction account identified by the transaction account selection.

2. The mobile device of claim 1, wherein the transaction account comprises a credit account.

3. The mobile device of claim 1, wherein receiving the transaction account selection comprises:
   determining if a default account selection exists based on the transaction amount of the future transaction;
   if the default account selection exists, defining the transaction account selection as a default account; and
   if the default account selection does not exist, obtain a further transaction account selection for a user authorized to access an application.

4. The mobile device of claim 1, wherein the short-range communication module comprises a near-field communications module.

5. The mobile device of claim 4, wherein the short-range communication module is embedded in the mobile device.

6. The mobile device of claim 4, wherein the short-range communication module comprises a stand-alone module.

7. The mobile device of claim 4, wherein the short-range communication module comprises an integrated module.

8. The mobile device of claim 4, wherein the short-range communication module is included in a subscriber identity module.

9. The mobile device of claim 4, wherein the short-range communication module comprises is included in a removable media.

10. The mobile device of claim 1 further comprising a case that houses the processor, the memory, and the transceiver.

11. The mobile device of claim 10, wherein the short-range communication module is attached to the case.

12. The mobile device of claim 10, wherein the short-range communication module is molded into a portion of the case.

13. The mobile device of claim 1, wherein the short-range communication module comprises a bluetooth module.

14. The mobile device of claim 1, wherein the short-range communication module comprises a radio frequency identification module.

15. The mobile device of claim 1, wherein the transaction account comprises a bank account.

16. The mobile device of claim 1, wherein the instructions, when executed by the processor, cause the processor to perform operations further comprising:
receiving, during the future transaction, a message from the network processing system, the message comprising a request for a mobile device user to select a further transaction account to use for payment for the future transaction;
obtaining selection of the further transaction account during the future transaction; and
sending data identifying the further transaction account selected to the network processing system.

17. The mobile device of claim 1, wherein the instructions, when executed by the processor, cause the processor to perform operations further comprising:
receiving, during the future transaction, a message from the network processing system, the message comprising a request for a mobile device user to select a further transaction account to use for payment for the future transaction;
prompting for a password before allowing selection of the further transaction account;
obtaining the selection of the further transaction account during the future transaction; and
sending data identifying the further transaction account selected to the network processing system.

18. The mobile device of claim 1, wherein the instructions, when executed by the processor, cause the processor to perform operations further comprising:
receiving, during the future transaction, a message from the network processing system, the message comprising a request for a mobile device user to select a further transaction account to use for payment for the future transaction;
obtaining selection of the further transaction account during the future transaction;
prompting for a password before accepting the selection of the further transaction account; and
sending data identifying the further transaction account selected to the network processing system.

19. The mobile device of claim 1, wherein the transaction account selection is used by the network processing system to define the transaction account for a period of time, and wherein the network processing system does not use the transaction account after the period of time.

20. The mobile device of claim 1, wherein the transaction account selection is used by the network processing system to define a number of transactions for which the transaction account will be used, and wherein the network processing system does not use the transaction account after the number of transactions.

21. The mobile device of claim 1, wherein the unique customer identifier further comprises a telephone number.

22. The mobile device of claim 1, wherein the unique customer identifier further comprises an international mobile subscriber identifier.

23. The mobile device of claim 1, wherein the unique customer identifier further comprises an international mobile equipment identifier.

24. The mobile device of claim 1, wherein the unique customer identifier further comprises a virtual account number.

25. The mobile device of claim 1, wherein the instructions, when executed by the processor, cause the processor to perform operations further comprising:
receiving an indication that the transaction account has been declined;
disabling a default account rule; and
requiring a further transaction account to be selected.

26. The mobile device of claim 25, wherein the instructions, when executed by the processor, cause the processor to perform operations further comprising receiving log-in information for the further transaction account, wherein receiving the log-in information comprises utilizing an auto-completion feature to populate required authorization fields using data stored on the mobile device.

27. The mobile device of claim 1, wherein receiving the transaction account selection further comprises selecting a further transaction account based upon a default rule to be used for transactions when a communications link between the mobile device and the network processing system is unavailable.

* * * * *